(12) United States Patent
Rehill

(10) Patent No.: US 6,439,109 B1
(45) Date of Patent: Aug. 27, 2002

(54) BARBEQUE WITH A PLURALITY OF SKEWERS

(76) Inventor: John Rehill, Apartado Postal 644, Tegucigalpa (HN)

( * ) Notice: Subject to any disclaimer, the term of this patent is extended or adjusted under 35 U.S.C. 154(b) by 0 days.

(21) Appl. No.: 09/258,272

(22) Filed: Feb. 26, 1999

(51) Int. Cl.[7] .................................................. A47J 37/04
(52) U.S. Cl. .................... 99/421 R; 99/421 H; D07/338
(58) Field of Search .................. 99/421 H, 421 HH, 99/421 R; D07/332, 334, 338

(56) References Cited

U.S. PATENT DOCUMENTS

| | | | | |
|---|---|---|---|---|
| 3,848,523 A | * | 11/1974 | Galisz et al. | 99/421 H |
| 3,939,761 A | * | 2/1976 | McGinty | 99/421 H |
| 4,154,154 A | * | 5/1979 | Vivian | 99/421 HH |
| 4,158,991 A | * | 6/1979 | Nakashima | 99/421 H |
| 4,760,776 A | * | 8/1988 | Beidler | 99/421 H |
| 5,154,159 A | * | 10/1992 | Knafelc et al. | 126/25 R |
| 5,172,628 A | * | 12/1992 | Pillsbury et al. | 99/421 H |
| 5,649,475 A | * | 7/1997 | Murphy et al. | 99/421 H |
| 5,715,744 A | * | 2/1998 | Coutant | 99/421 H |

* cited by examiner

*Primary Examiner*—Milton Cano
*Assistant Examiner*—Sherry A. Dauerman

(57) ABSTRACT

A barbeque (10) comprising a kettle (12) which has at least one drive (18) positioned in the kettle (12), wherein the drive has a drive shaft (18B) with a drive sprocket (18A) attached to the distal end of the shaft, a drive gear (18C) which is positioned within a plurality of kettle front holders (12FA), wherein the kettle front holders (12FA) contain a plurality of skewers (24) rotatably positioned within skewer. supports (24E) in the kettle front holders (12FA), the skewer supports (24E) have at least one skewer support idler (24EA) which has a skewer support L-member (24EB) connected to the skewer support (24EA). such that when a user pushes down on the skewer support L-member (24EB), the skewer support idler (24EA) is raised disengaging the skewer gear (24D) from the drive gear (18C) which allows for the removal of the skewer (24)from the kettle (12), wherein the barbeque may further comprise a rotisserie (16) which has a rotisserie shaft (16B) having a rotisserie sprocket (16A) at one distal end, wherein the rotisserie sprocket (16A) is in communication with the drive sprocket (18A) by a chain (20).

20 Claims, 11 Drawing Sheets

BARBEQUE WITH A PLURALITY OF SKEWERS

BACKGROUND OF THE INVENTION

1. Field of the Invention

The present invention relates to apparatus for cooking foods. More particularly, the present invention relates to apparati for cooking foods over an open flame.

2. Description of the Prior Art

Numerous innovations for barbeques have been provided in the prior art that are described as follows. Even though these innovations may be suitable for the specific individual purposes to which they address, they differ from the present invention as hereinafter contrasted.

In U.S. Pat. No. 5,245,917, titled Skewer Assembly Incorporating a Counterbalancing Device, invented by Erich J. Schlosser a skewer assembly that incorporates a counterbalancing device for use with a barbecue grill or other rotisserie assembly includes a generally rectangular shaft that has a handle releasably secured to one end thereof through a releasable end piece. The counter balancing device has a counter weight on one free end. The counter weight is used to balance off center loads on the skewer to achieve uniform rotation.

The present invention differs from the above described patented invention because the patented invention is a balancing device for a skewer. The present invention is a rotation device for multiple skewers on a single grill.

In U.S. Pat. No. 3,943,837, titled Dual Purpose Barbecue Grill and Rotisserie, invented by Theodore Trikia a dual purpose cooking device is provided in which foods may be cooked simultaneous on a barbecue grill and a rotisserie bar. The cooking device is adjustable, versatile, and efficient. Cooking temperature and speed are varied by adjusting height of fuel tray and barbecue grill.

The present invention differs from the above described patented invention because the patented invention is limited to one skewer. The present invention may have at least two skewers.

In U.S. Pat. No. 5,176,124, titled Smoke Free Barbecue Cooker, invented by Carl O. Wrasse, a smokeless, non-polluting barbecue cooker has a base canister with a centrally located firebox which connects with a flue to conduct heat produced by the burning fuel, upwards to an oven enclosure. A grill for cooking supports the food away from the firebox so food dripping cannot fall on the hot coals.

The present invention differs from the above described patented invention because the patented invention does not have a skewer. The present invention may have at least two skewers.

In U.S. Pat. No. 5,213,027, titled Barbecue Assembly, invented by Thomas A. Tsotsos and Robert L. Bundschuh, a barbecue grill assembly including a main cooking chamber, a removable cooking grid positioned within the main chamber above a primary heat source, a frame for supporting cooking grid and drawer element connected to and supporting the frame for rollably withdrawing the cooking grid from the main chamber. A mechanism raises and lowers the cooking grid with respect to the heat source. A single rotisserie is provided.

The present invention differs from the above described patented invention because the patented invention does not have a skewer. The present invention may have at least two skewers. The heat source in the present invention is adjustable with respect to the grid.

In U.S. Pat. No. 5,154,159, titled Turbo Grill-Cooker invented by Frank M. Kuafeic, a portable barbecue cooker for use without solvent ignition means or impregnated charcoal briquets. A turbo air blower communicates with ignited briquets through a distribution port plenum chamber and brings ignited briquets to operating temperature rapidly. A vertically and rotationally moveable elevator brings the briquets at operating temperature to the char grill, distributes the briquets evenly thereupon. The elevator engages the char grill for vertical movement and for variable spacing with respect to the cook grill. The char grill is equipped with a support cage that rotates the char grill to move ashes from the cooker bowl bottom for transport to an ash collector.

In U.S. Pat. No. 5,458,054, titled Barbecue Grill Assembly, invented by Ali Yu and Changhua Yuanlin Chen, a barbecue grill assembly is described which includes a first bowl, a second bowl disposed on the first bowl, a grate disposed on the second bowl, a bolt and a crank. The first bowl has a first bottom and a first skirt, a central tube extending from the first bottom thereof and two first slot are defined in a periphery of the central tube and each disposed diametrically opposite in the central tube, a second slot is defined in the first skirt. The second bowl has a second bottom and a second skirt, the second bottom for charcoal disposed thereon has a central hole and a plurality of vents defined therein and a long tube has a first end having a receiving hole defined therein for a stud extending downnwardly from the gate inserted therein and a second end inserted in the central tube, the second end of the long tube has a U-shaped tunnel defined therein such that the bolt extends through the second slot, the first slots and the U-shaped tunnel to engage to a nut. The crank is engaged between two engaging holes defined in the first skirt and is disposed between the bolt and the first bottom of the first bowl such that a distance from the second bottom of the second bowl to the grate is adjusted by rotating the crank.

The patented invention differs from the present invention because the patented invention is a barbecue grill assembly which can be adjusted in height from the charcoal bed. In the present invention a charcoal tray is positioned beneath the skewers and the rotisserie. The charcoal tray functions to hold charcoal. The charcoal tray is adjustable in height.

In U.S. Pat. No. 4,583,452 titled Food Holder for Barbecue Rotisserie, invented by Erick F. Grosse, a food holder for a barbecue rotisserie is diclosed. The food holder includes a rigid, planar frame which defines an unobstructed food encompassing void within which the food may be positioned without being pierced. First and second coaxial rods and are secured to opposite end of frame to form a rigid unit and extend outwardly for mounting frame for rotation on a barbecue grill.

First and second pairs of outwardly and radially extending spokes are mounted on and carried, respectively, by opposite ends of frame for rotation therewith. First and second food support members are provided for being mounted on spokes and being secured thereto with wing nuts. The food support members cooperate with each other and with frame to define enclosures within which food may be placed without obstruction.

The patented invention differs from the present invention because the patented invention is a food holder for a barbecue rotisserie having a rigid, planar frame. The patented invention lacks features similar to the present invention.

In U.S. Pat. No. 4,561,417, titled Barbecue Oven, invented by Ming-Tang Chen, a barbecue grill is described which has several dish-shaped racks which can be optionally assembled and disassembled, and supported to rotate: and control the degree of heat applied to the meat and prevent burning it, part of the racks being far away from the fire for holding meat or other food for slow cooking, warming, or cooling. The bottom of the grill has a plate for holding charcoal and holes in the plate for dropping charcoal or ash, to an ash collecting drawer. At two sides of the body, are side plates which incline outward. If ash is full in the ash receiver drawer, it can be drawn and poured out. Support legs insert into the grill body to support the body in use, and can be inverted to form a portable handle, so that after used, the dish-shaped racks can be disassembled and stored in the body, and the side plates are folded to cover the body, and the support legs are inverted to become a handle making the grill very convenient to be carried.

The patented invention differs from the present invention because the patented invention is a barbecue grill is described which has several dish-shaped racks which can be supported to rotate and control the degree of heat applied to the a food product. The patented invention lacks a rotisserie. The patented invention lacks features similar to the present invention.

In U.S. Pat. No. 4,370,920, titled Rotating Barbecue Grill, invented by Joseph Henriques and Robert A Bennett, a rotating barbecue grill is described for uniformly and automatically cooking frankfurters, sausages, hamburgers, steaks, and other food items through the use of rotating rods or rollers defining a grilling surface. One of the rods is directly driven by a motor with the remaining rods rotating in unison by a crank-type drive mechanism. A hot plate is positioned adjacent one of the end rollers so that flat items of food, such as hamburgers, which cannot be turned between the rollers, are moved by the rollers to the hot plate and deposited thereon so as to keep them warm without overcooking.

The patented invention differs from the present invention because the patented invention is a rotating barbecue grill is described for uniformly and automatically cooking frankfurters, sausages, hamburgers, steaks, and other food items through the use of rotating rods or rollers defining a grilling surface. The patented invention lacks a rotisserie. The patented invention lacks features similar to the present invention.

In U.S. Pat. No. 3,943,837, titled Dual Purpose Barbecue Grill and Rotisserie, invented by Theodore Trkla, a dual purpose cooking device is provided in which foods may be cooked simultaneously on a barbecue grill and a rotisserie bar. The cooking device is portable, versatile, and efficient. Cooking temperature and speed are varied by adjusting height of fuel tray and barbecue grill.

The patented invention differs from the present invention because the patented invention is a dual purpose cooking device is provided in which foods may be cooked simultaneously on a barbecue grill and a rotisserie bar. Cooking temperature and speed are varied by adjusting height of fuel tray and barbecue grill. The rotisserie bar is driven by a chain drive mechanism.

Numerous innovations for barbeque have been provided in the prior art that are adapted to be used. Even though these innovations may be suitable for the specific individual purposes to which they address, they would not be suitable for the purposes of the present invention as heretofore described.

SUMMARY OF THE INVENTION

The present invention is a barbecue having a rotisserie and skewers. The present invention has a barbecue tub having a skewer retention means. The present invention further includes a motor having a sprocket gear and a elongated shaft. A chain drive is connected to the sprocket gear. A rotisserie having a shaft with a sprocket gear on one end and filled into a bearing on the opposite end is supported by the barbecue tub. The sprocket gear engages the chain drive. A plurality of spaced apart screw gears are securely attached to the elongated shaft A plurality of skewers having a food product attachments means and a drive gear are supported on the barbecue tub by a skewer retention means. The drive gear removably engages the screw gears when the skewer in positioned within the skewer retention means. A charcoal tray positioned beneath the skewers and rotesserie functions to hold charcoal. The charcoal tray is adjustable in height.

A cover is provided to cover the entire top of the grill when needed. The pedestal is supported by wheels, castors or adjustable feet.

The types of problems encountered in the prior art are barbequing using multiple rotating skewers.

In the prior art, unsuccesful attempts to solve this problem were attempted namely; multiple barbeques or barbequing food products serially. However, the problem was solved by the present invention because multiple skewers maybe be rotated at a time.

Innovations within the prior art are rapidly being exploited as cooking and in particular barbequing becomes increasingly popular.

The present invention went contrary to the teaching of the art by providing for at least two skewers and heat source which is adjustable with respect to the grid.

The present invention solved a long felt need multi skewer barbeque.

Accordingly, it is an object of the present invention to provide kettle having a kettle cover. A kettle cover handle is atached to the kettle cover so a user can lift the cover when the kettle cover is hot without being burned.

More particularly, it is an object of the present invention to provide kettle cover guage which indicates the temperature under the kettle cover.

In keeping with these objects, and with others which will become apparent hereinafter, one feature of the present invention resides, breifly stated, in a work table functioning to support food products.

When the barbecue is designed in accordance with the present invention, a rotisserie and multiple skewers can be rotated together.

In accordance with another feature of the present invention, a rotisserie is provided with a rotisserie sprocket which is attached to a rotisserie shaft. The rotisserie sprocket engages a chain.

Another feature of the present invention is that a motor rotates the chain which is engaged with a rotisserie sprocket.

Yet another of the present invention is that a drive has a drive sprocket attached to a drive shaft. A drive gear is driven by a motor to rotate the drive sprocket.

Still another feature of the present invention is that a skewer has a handle which insulates the user from a skewer tine. The handle further has a skewer gear engages the drive gear which when the drive shaft is rotating causes the skewer to rotate.

Yet still another feature of the present invention is that the skewer gear and the drive gear are a screw gear set.

Still yet another feature of the present invention is that a skewer support idler supports the skewer.

Another feauture of the present invention is that the skewer support idler is removably attached to a skewer support L-member.

Yet another feature of the present invention is that the heat source is adjustable relative to the skewers. The tray has a tray left lift hook which engages a kettle left side support. When the tray left lift hook is moved a tray left lift hook pin disengages from the kettle left side support permitting the tray to be repositioned.

Still another feauture of the present invention is that the barbecue has a work table functioning to support food.

Yet still another feature of the present invention is that a housing supports the barbeque at a operational height.

Still yet another feature of the present invention is that a charcoal tray is adjustable relative to the food products.

Another feature of the present invention is that the heat source may be charcoal or combustable gas.

Yet another feature of the present invention is that the gas is adjustable relative to the food products.

The novel features which are considered characteristic for the invention are set forth in the appended claims. The invention itself, however, both as to its construction and its method of operation, together with additional objects and advantages thereof, will be best understood froom the following description of the specific embodiments when read and understood in connection with the accompanying drawings.

LIST OF REFERENCE NUMERALS UTILIZED IN THE DRAWINGS

10—barbeque (10)
12—kettle (12)
12A—kettle cover (12A)
12AA—kettle cover handle (12AA)
12AB—kettle cover gauge (12AB)
12L—kettle cover left hinge (12L)
12R—kettle cover right hinge (12R)
12F—kettle front (12F)
12FA—kettle front holder (12FA)
12B—kettle back (12B)
12LS—kettle left side (12LS)
12LA—kettle left side support (12LA)
12RS—kettle right side (12RS)
12RA—kettle right side support (12RA)
14—work table (14)
14L—left work table (14L)
14R—right work table (14R)
16—rotisserie (16)
16A—rotisserie gear (16A)
16B—rotisserie shaft (16B)
16C—rotisserie tine (16C)
16D—rotisserie bearing (16D)
18—drive (18)
18A—drive sprocket (18A)
18B—drive shaft (18B)
18C—drive gear (18C)
20—chain (20)
22—motor (22)
24—skewer (24)
24A—skewer handle (24A)
24B—skewer bushing (24B)
24C—skewer tine (24C)
24D—skewer gear (24D)
26—tray (26)
26LA—tray left lift hook (26LA)
26LAA—tray left lift hook pin (26LAA)
26RA—tray right lift hook (26RA)
26RAA—tray right lift hook pin (not shown)
28—housing (28)
28A—housing door (28A)
28B—housing base (28B)
28C—housing wheel (28C)
30—grill (30)
32—charcoal tray (32)
32L—charcoal tray left pin (32L)
32R—charcoal tray right pin (32R)
34—gas burner (34)
34L—gas burner left control (34L)
34R—gas burner right control (34R)
36—brick tray (36)
36A—ceramic brick (36A)

DESCRIPTION OF THE PREFERRED EMBODIMENT

Figure 1:
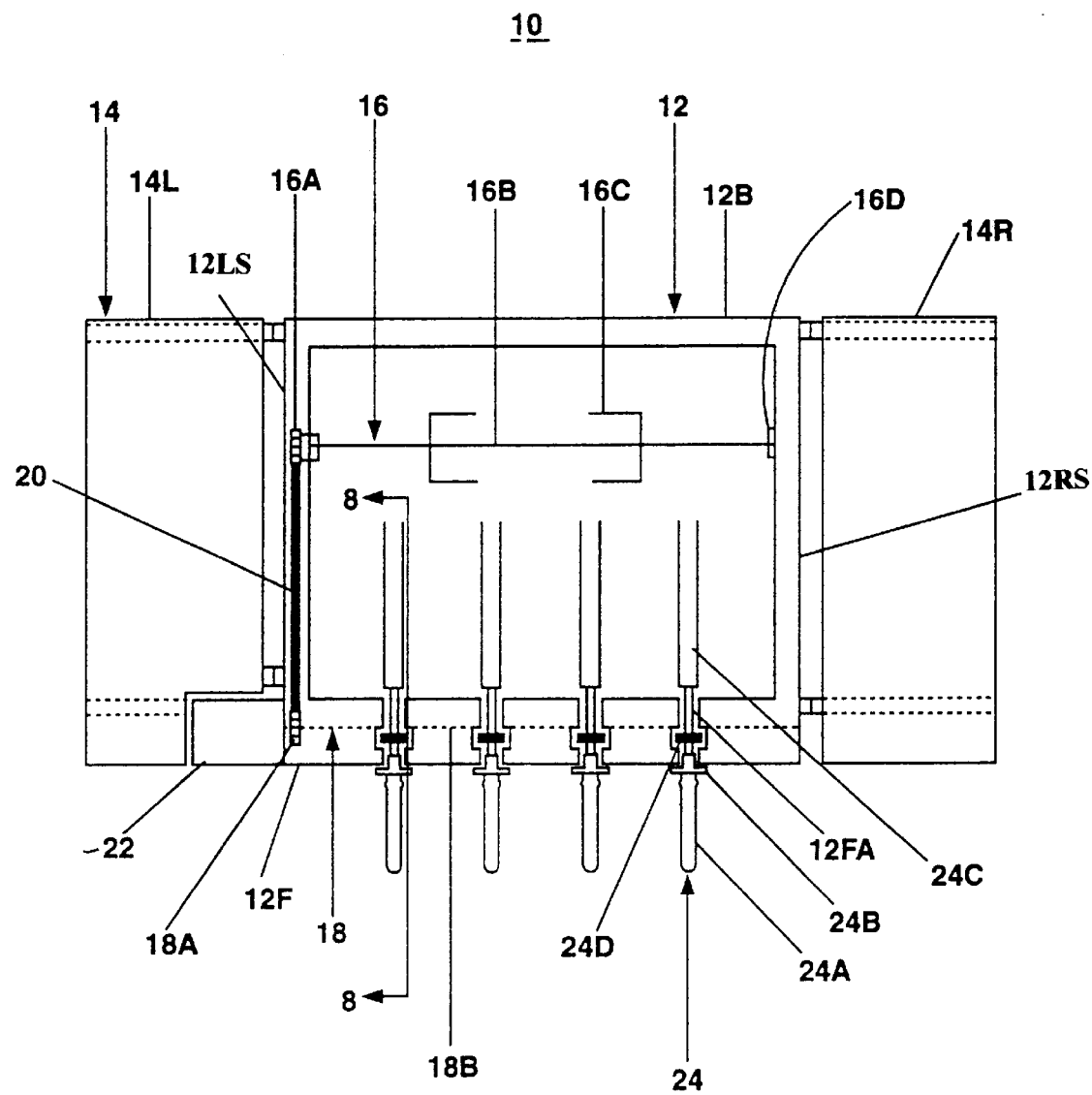
FIG. 1 is a top view of a barbeque.

Firstly, referring to FIG. 1 which is a top view of a barbeque (10). The barbeque (10) comprises a kettle (12) which comprises a kettle front (12F) having at least one kettle front holder (12FA) therein, kettle back (12B), kettle left side (12L), and kettle right side (12R).

The barbeque (10) further comprises at least one drive (18) positioned in the kettle (12). The at least one drive (18) comprises a drive shaft (18B) having a drive sprocket (18A) securely attached at one distal end.

The barbeque (10) further comprises a motor (22) which is connected to the drive shaft (18B) functioning to rotate the drive (18).

The barbeque (10) further comprises a skewer (24) is rotatably positioned within the at least one kettle front holder (12FA). The skewer (24) comprises a skewer handle (24A) connected to a skewer tine (24C) having a skewer bushing (24B) positioned thereon adjacent to the skewer handle (24A). A skewer gear (24D) is securely positioned on the skewer tine (24C) over the at least one drive gear (18C) engaging thereto.

The barbeque (10) further comprises a work table (14) is attached thereto. The work table (14) comprises a left work table (14L) connected to the kettle left side (12LS) and a right work table (14R) connected to the kettle right side (12RS).

The barbeque (10) further comprises a rotisserie (16) which comprises a rotisserie shaft (16B) having a rotisserie sprocket (16A) securely mounted at one distal end. The rotisserie shaft (16B) further comprises a rotisserie tine (16C) thereon. The rotisserie sprocket (16A) is in communication with the drive sprocket (18A) by a chain (20). The rotisserie (16) further comprises a rotisserie bearing (16D) positioned at an opposite distal end of the rotisserie shaft (16B) from the rotisserie sprocket (16A).

Figure 2:
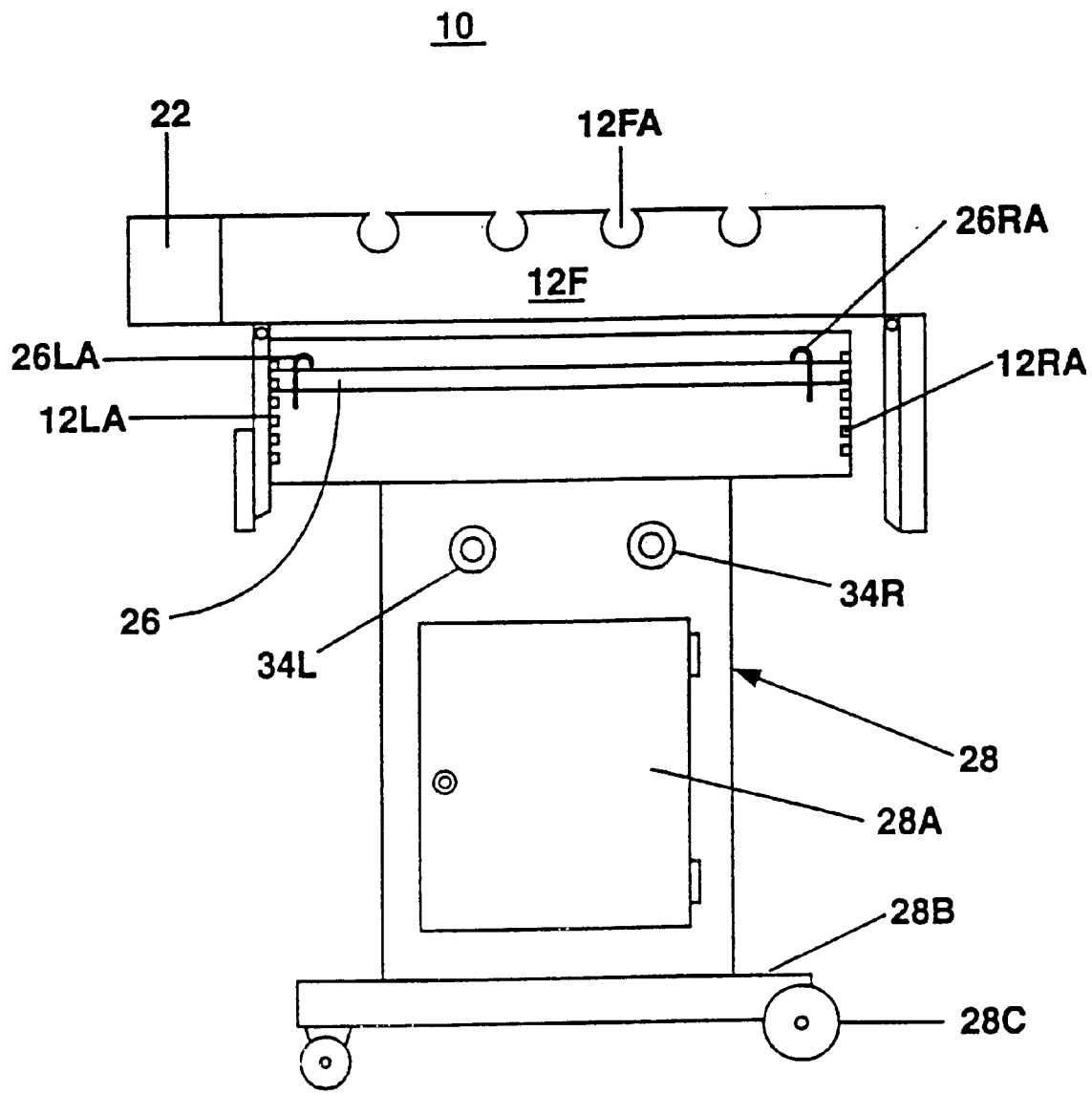
FIG. 2 is a front view of a barbeque.
Figure 3:
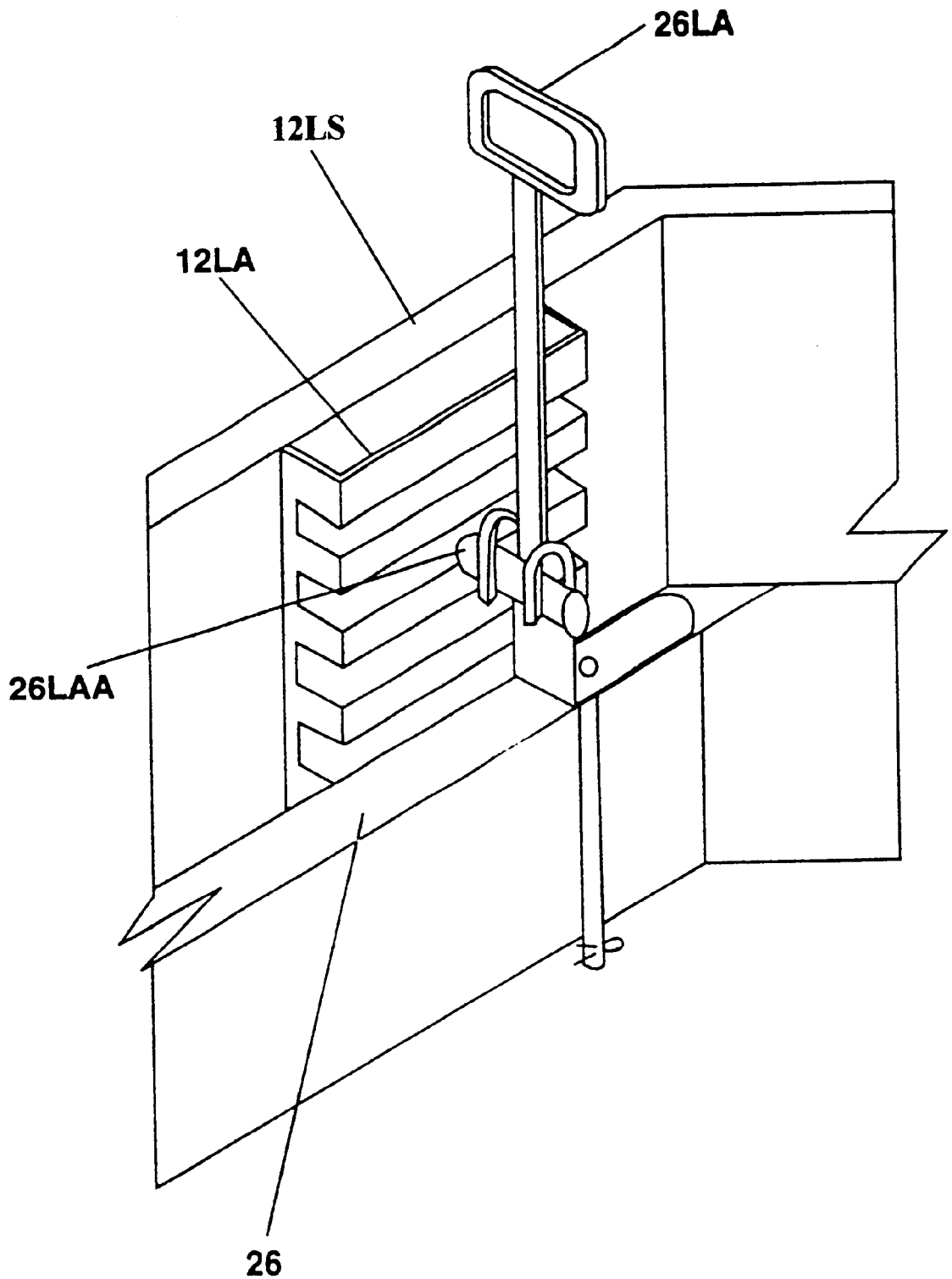
FIG. 3 is an enlarged view of a kettle left side support.

Secondly, referring to FIG. 2 which is a front view of a barbeque (10). The barbeque (10) comprises a kettle (12) which comprises a kettle front (12F) having at least one kettle front holder (12FA) therein.

The barbeque (10) further comprises a housing (28) securely connected to a bottom of the kettle (12). The housing (28), comprises a housing door (28A). The housing (28) further comprises a housing base (28B). The housing base (28B) comprises at least two housing wheels (28C) rotatably mounted thereon.

The barbeque (10) further comprises a gas burner (34) positioned within the kettle (12), the gas burner (34) comprises at least two controls, a gas burner left control (34L) and a gas burner right control (34R).

Thirdly, referring to: FIG., 3 which is an enlarged view of a kettle left side support (12LA). The barbeque (10) comprises a kettle left side (12LS). The kettle left side (12LS) further comprises a kettle left side support (12LA). The tray left lift hook (26LA) has a tray left lift hook pin (26LAA) and a tray right lift hook (26RA) having a tray right lift hook pin (not shown). The tray left lift hook pin (26LAA) engages the kettle left side support (12LA) and the tray right lift hook pin (not shown) engages the kettle right side support (12RA).

Figure 4:
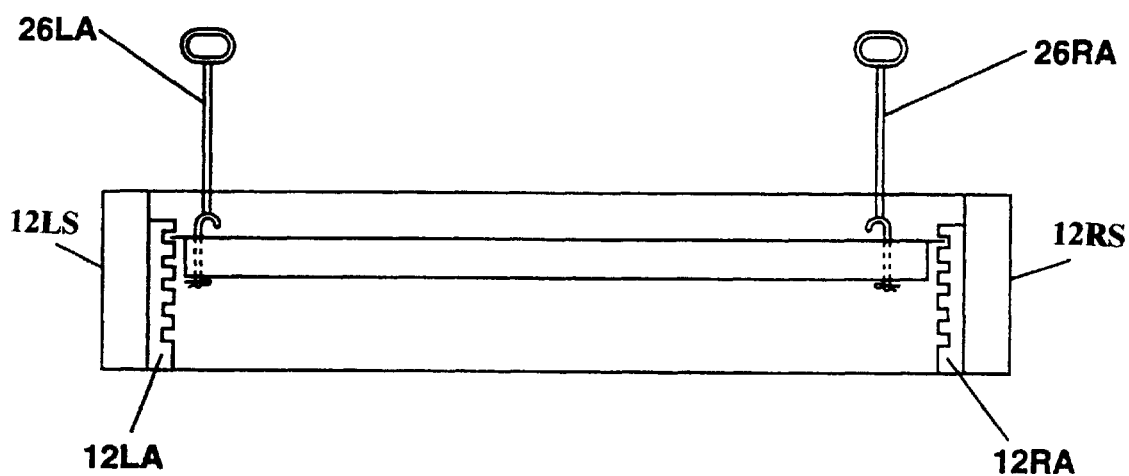
FIG. 4 is a front view of a barbeque.

Next, referring to FIG. 4 which is a front view of a barbeque (10). The barbeque (10) comprises a kettle (12) which comprises a kettle left side 12LS, and kettle right side 12RS. The kettle left side (12L) further comprises a kettle left side support (12LA) and the kettle right side (12R) further comprises a kettle right side support (12RA).

The barbeque (10) further comprises a tray (26) positioned within the kettle (12). The tray (26) further comprises a tray left lift hook (26LA) having a tray left lift hook pin (26LAA) and a tray right lift hook (26RA) having a tray right lift hook pin (not shown). The tray left lift hook pin (26LAA) engages the kettle left side support (12LA) and the tray right lift hook pin (not shown) engages the kettle right side support (12RA).

Figure 5:
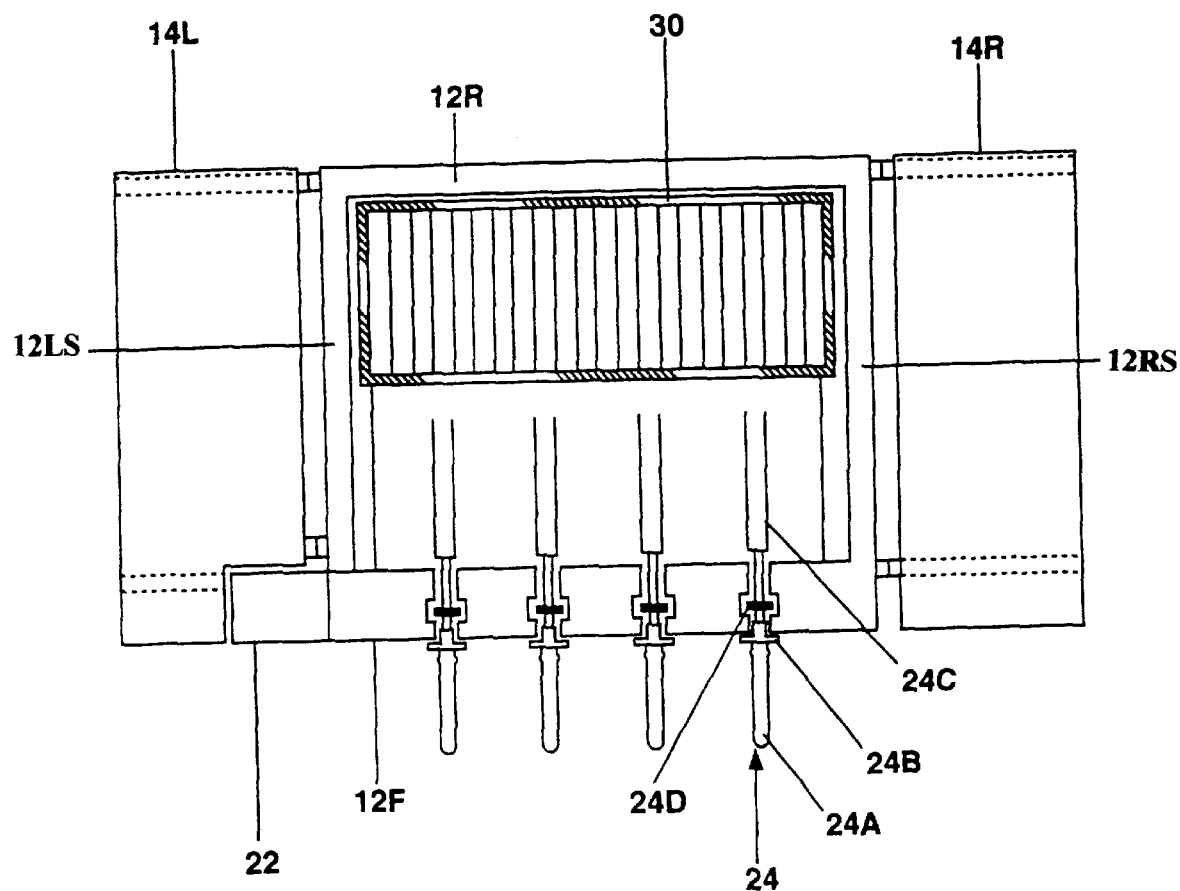
FIG. 5 is a too view of a barbeque exhibiting a grill.

Next, referring to FIG. 5 which is a top view of a barbeque (10) exhibiting a grill (30). The barbeque (10) further comprises a motor (22). The barbeque (10) further comprises a skewer (24). The skewer (24) comprises a skewer handle (24A) connected to a skewer tine (24C) having a skewer bushing (24B) positioned thereon adjacent to the skewer handle (24A). A skewer gear (24D) is securely positioned on the skewer tine (24C). The barbeque (10) further comprises a left work table (14L) connected to the kettle left side (12L) and a right work table (14R) connected to the kettle right side (12R). The barbeque (10) further comprises a grill (30) positioned within the kettle (12).

Figure 6:
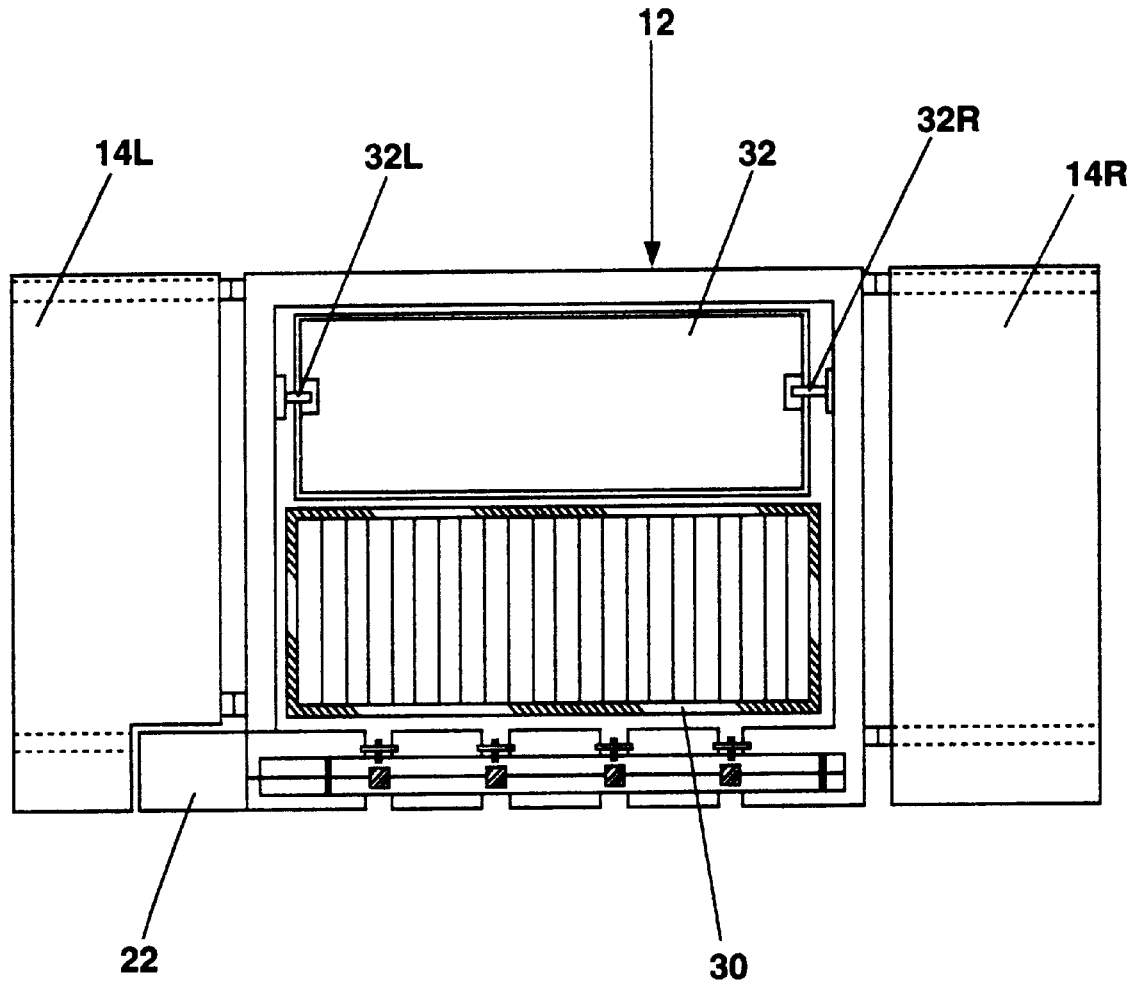
FIG. 6 is a top view of a barbeque exhibiting a grill and a charcoal tray

Next referring to FIG. 6 which is a top view of a barbeque (10) exhibiting a grill (30) and a charcoal tray (32). The barbeque (10) further comprises a work table (14) which comprises the left work table (14L) which is connected to the kettle left side (12L) and a right work table (14R) which is connected to the kettle right side (12R).

The barbeque (10) further comprises a grill (30) positioned within the kettle (12).

The barbeque (10) farther comprises a charcoal tray (32) having a charcoal tray left pin (32L) and a charcoal tray right pin (32R) which engagably mount into the kettle left side support (12LA) and the kettle right side support (12RA), respectively.

Figure 7:
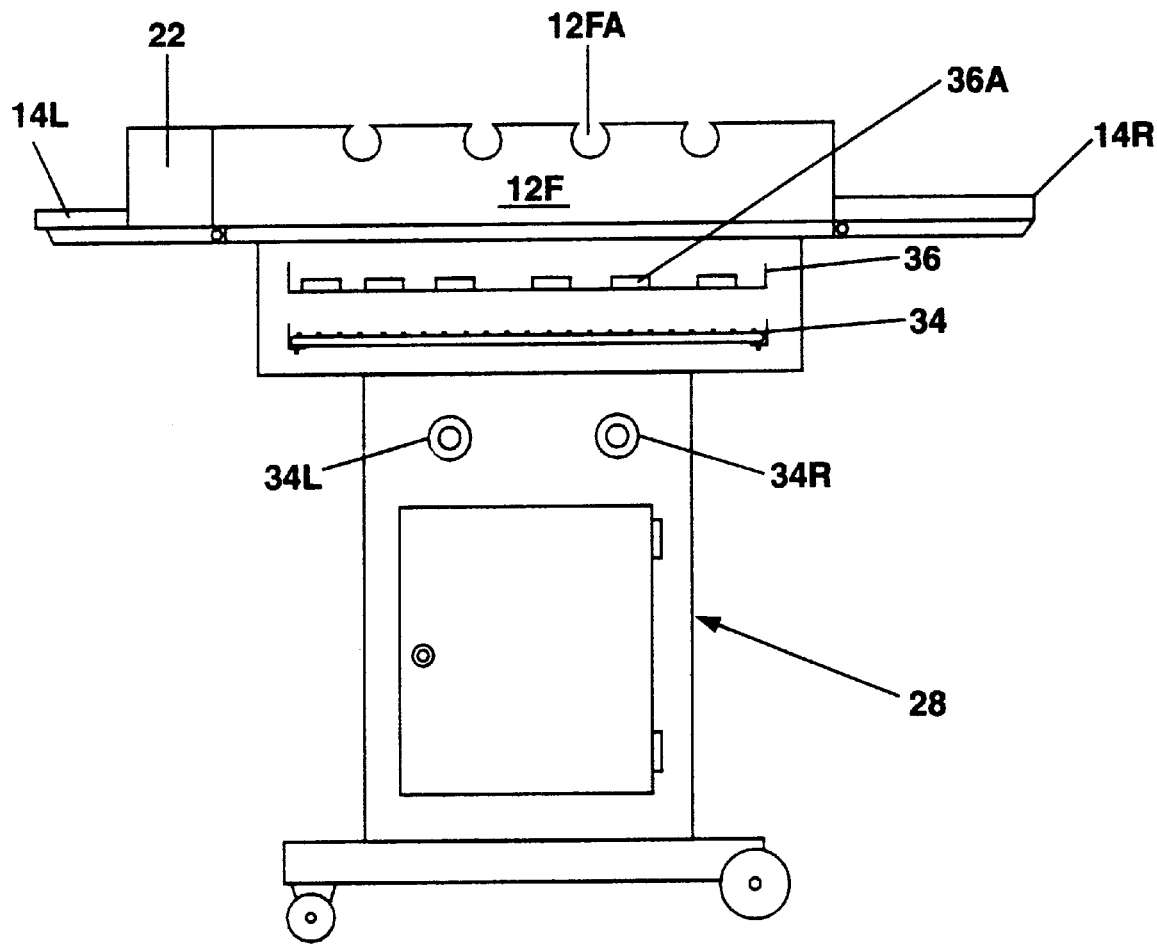
FIG. 7 is a front view of a barbeque.

Next, referring to FIG. 7 which is a front view of a barbeque (10) which comprises a kettle front (12F) having at least one kettle front holder (12FA).

The barbeque (10) further comprises a motor (22) connected to the drive shaft (18B) functioning to rotate the drive (18).

The barbeque (10) further comprises the left work table (14L) which is connected to the kettle left side (12L) and the right work table (14R) which is connected to the kettle right side (12R).

The barbeque (10) further comprises a gas burner (34) positioned within the kettle (12), the gas burner (34) comprises at least two controls, a gas burner left control (34L) and a gas burner right control (34R).

The barbeque (10) further comprises a brick tray (36) having a plurality of ceramic bricks (36A) thereon.

Figure 8:
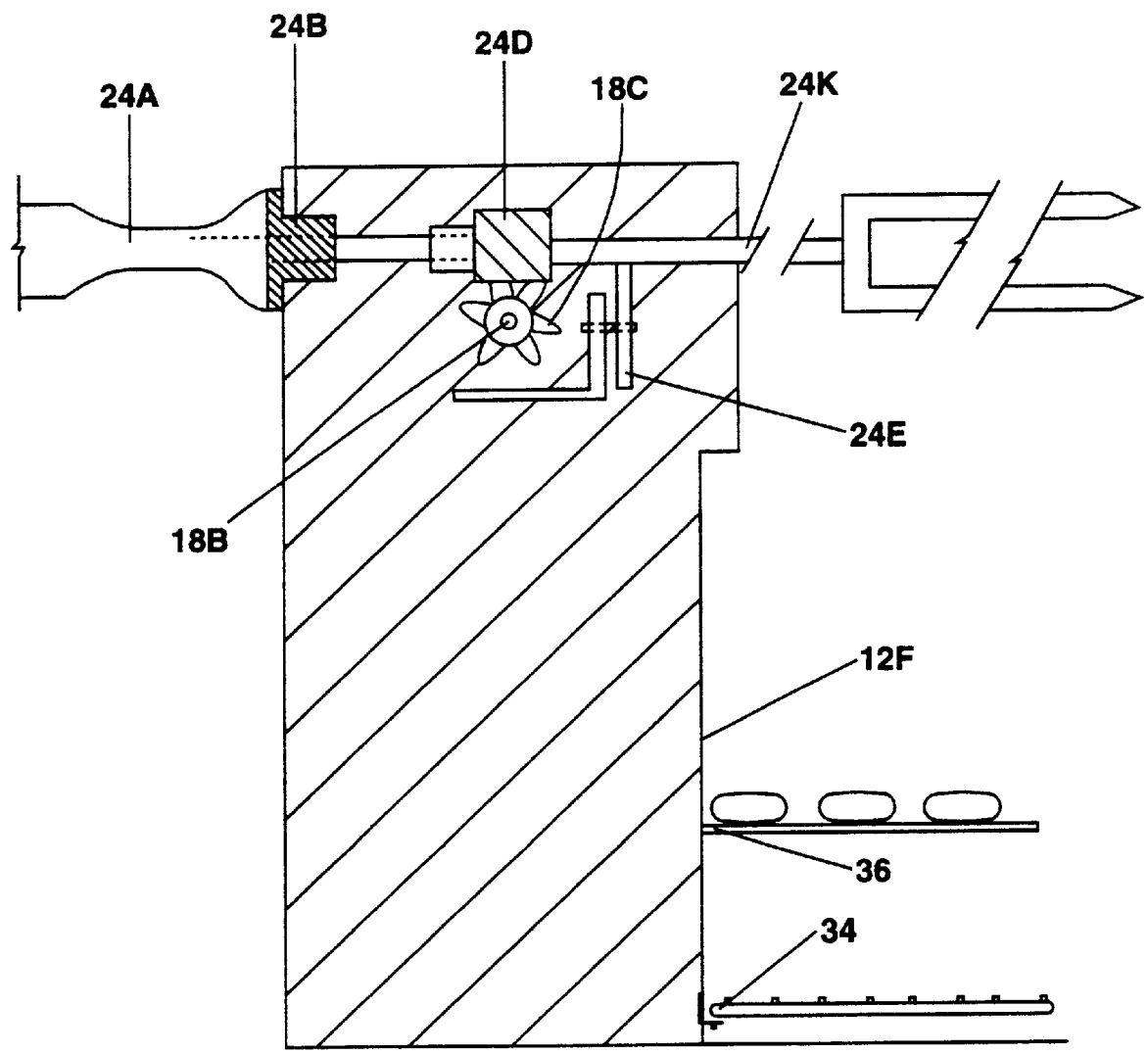
FIG. 8 is a cross sectional view of a kettle front along line 8—8 of FIG. 1.

Next, referring to FIG. 8 which is a cross sectional view of a kettle front (12F) along line 8—8 of FIG. 1. The at least one. drive (18) comprises drive shaft (18B) which is securely attached to at least one drive gear (18C) positioned thereon.

The barbeque (10) further comprises a skewer (24) is rotatably positioned within the at least one kettle front holder (12FA). The skewer (24) comprises a skewer handle (24A) connected to a skewer tine (24C) having a skewer bushing (24B) positioned thereon adjacent to the skewer handle (24A). A skewer gear (24D) is securely positioned on the skewer tine (24C) over the at least one drive gear (18C) engaging thereto.

The barbeque (10) further comprises at least one skewer support (24E) is positioned under the at least one kettle front holder (12FA). The at least one skewer support (24E) comprises a skewer support idler (24EA) having the at least one skewer tine (24C) resting on a top distal end thereof The at least one skewer support (24E) further comprises a skewer support L-member (24EB) connected to the skewer support idler (24EA) by a skewer support connector (24EC). When a user pushes down on the skewer support L-member (24EB), the skewer support idler (24EA) is raised disengaging the skewer gear (24D) from the drive gear (18C). The barbeque (10) further comprises a gas burner (34) positioned within the kettle (12). The barbeque (10) further comprises a brick tray (36) having a plurality of ceramic bricks (36A) thereon.

Figure 8A:
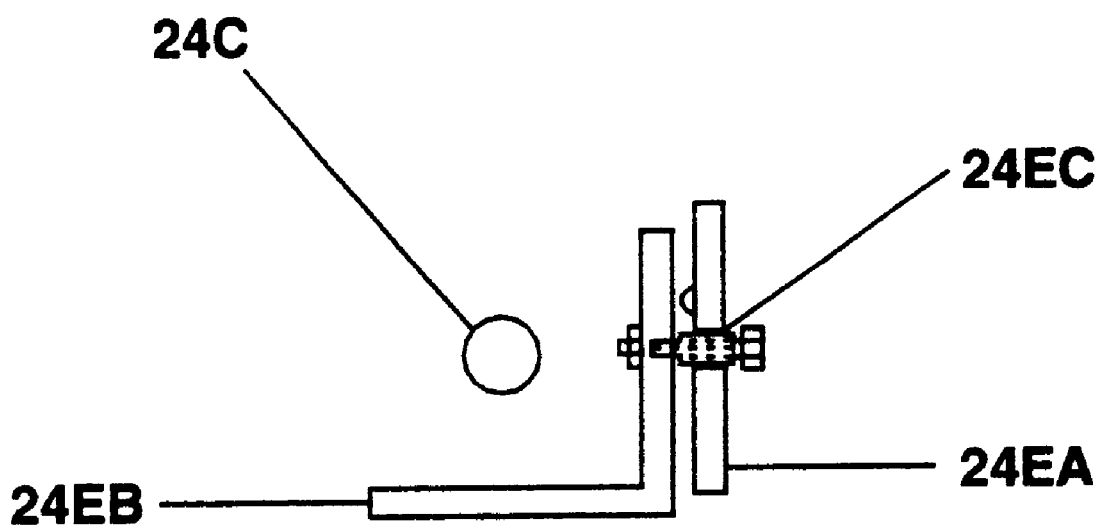
FIG. 8A is an enlarged view of a skewer support.

Next, referring to FIG. 8A which is an enlarged view of a skewer support (24E). The at least one skewer support (24E) comprises a skewer support idler (24EA) having the at least one skewer tine (24C) resting on a top distal end thereof. The at least one skewer support (24E) further comprises a skewer support L-member (24EB) connected to the skewer support idler (24EA) by a skewer support connector (24EC). When a user pushes down on the skewer support L-member (24EB), the skewer support idler (24EA) is raised disengaging the skewer gear (24D) from the drive gear (18C).

Figure 9A:
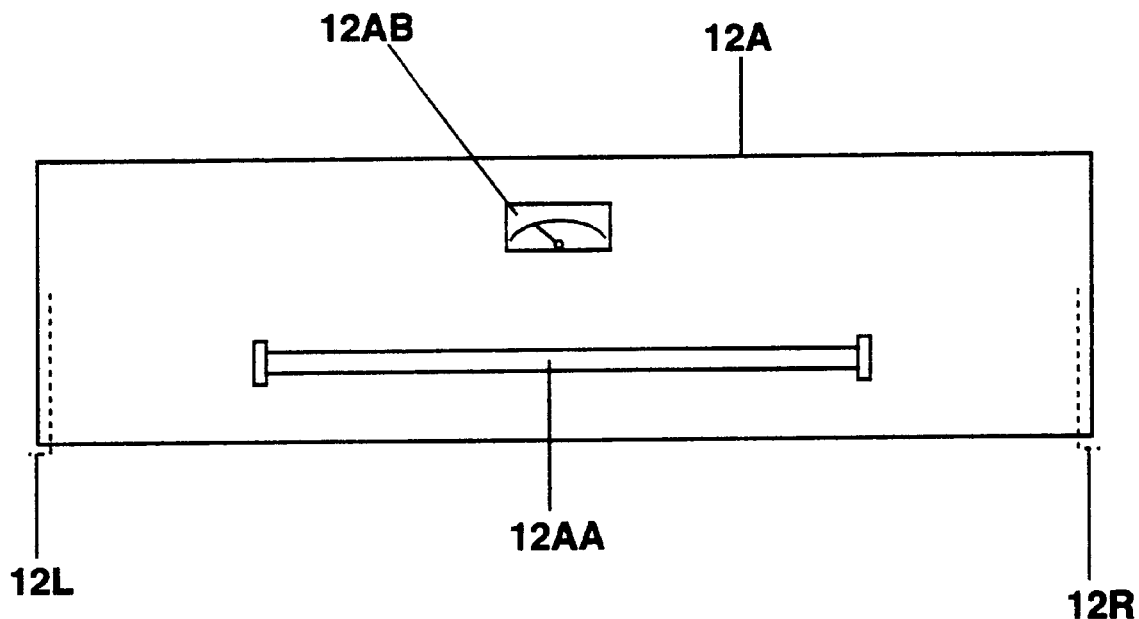
FIG. 9A is a front view of a kettle cover.

Next, referring to FIG. 9A which is a front view of a kettle cover (12A). The kettle cover (12A) is movably connected to the kettle left side (12LS) by a kettle cover left hinge (12L) and movably connected to the kettle right side (12RS) by a kettle cover right hinge (12AR). The kettle cover (12A) further comprises a kettle cover handle (12AA). The kettle cover (12A) further comprises a kettle cover gauge (12AB). The kettle left side (12LS) further comprises a kettle left side support (12LA) and the kettle right side (12RS) further comprises a kettle right side support (12RA).

Figure 9B:
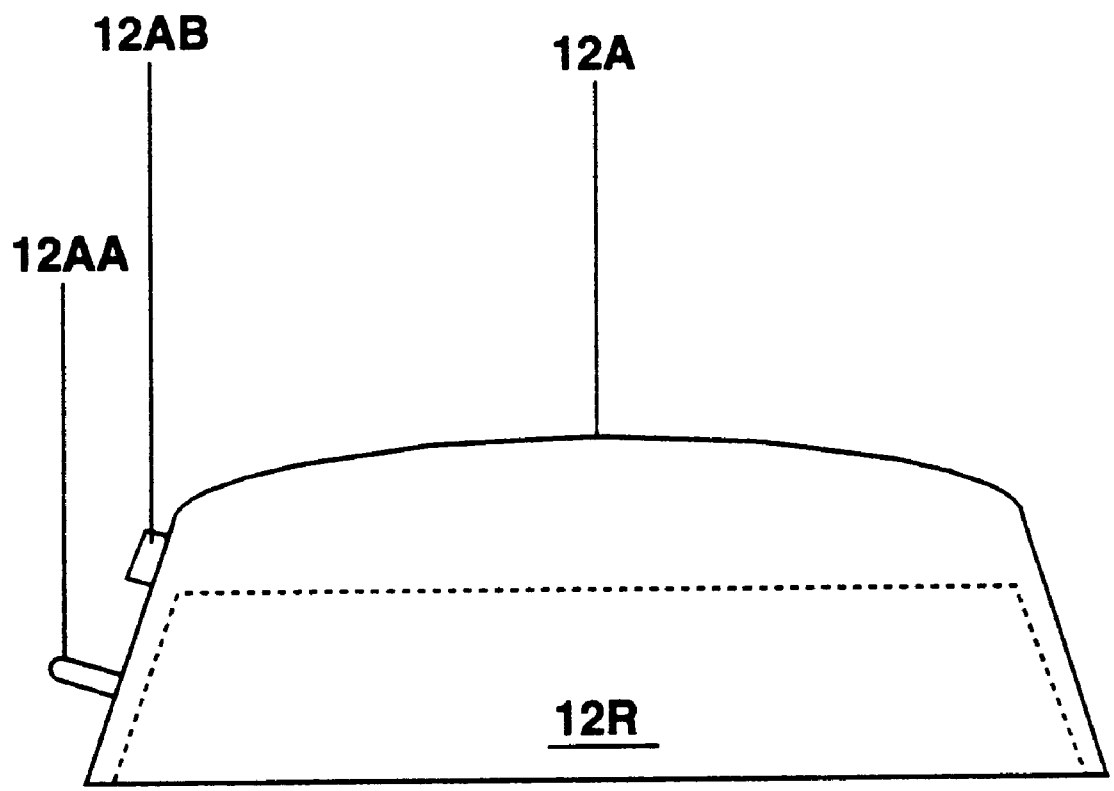
FIG. 9B is a side view of a kettle cover.

Lastly, referring to FIG. 9B which is a side view of a kettle cover (12A). The kettle cover (12A) comprises a kettle cover handle (12AA). The kettle cover (12A) further comprises a kettle cover gauge (12AB).

It will be understood that each of the elements described above, or two or more together, may also find a useful application in other types of constructions differing from the type described above.

While the invention has been illustrated and described as embodied in a barbeque, it is not intended to be limited to the details shown, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

What is claimed is:

1. A barbeque (10) comprising:
   A) a kettle (12) which comprises a kettle front (12F) having at least one kettle front holder (12FA) therein, kettle back (12B), kettle left side (12L), and kettle right side (12R);
   B) at least one drive (18) positioned in the kettle (12), the at least one drive (18) comprises a drive shaft (18B) having a drive sprocket (18A) securely attached at in one distal end, the at least one drive (18) further comprises at least one drive gear (18C) positioned thereon within the at least one kettle front holder (12FA);
   C) a motor (22) connected to the drive shaft (18B) functioning to rotate the drive (18);
   D) a plurality of skewers (24) rotatably positioned and removably attached to the at least one kettle front holder (12FA), each of the skewers (24) comprise a skewer handle (24A) connected to a skewer tine (24C) having a skewer bushing (24B) positioned thereon adjacent to the skewer handle (24A), a skewer gear (24D) is securely positioned on the skewer tine (24C) over the at least one drive gear (18C) engaging thereto; and
   E) at least one of a plurality of skewers supports (24E) positioned under the at least one kettle front holder (12FA), wherein the at least one skewer support (24E) comprises a skewer support idler (24EA) having the at least one skewer tine (24C) resting on a top distal end thereof, the at least one skewer support (24E) further comprises a skewer support L-member (24EB) connected to the skewer support idler (24EA) by a skewer support connector (24EC), such that when a user pushes down on the skewer support L-member (24EB), the skewer support idler (24EA) is raised disengaging the skewer gear (24D) from the drive gear (18C) to remove the skewer from the kettle.

2. The barbeque (10) as described in claim 1, wherein the kettle (12) further comprises a kettle cover (12A).

3. The barbeque (10) as described in claim 2, wherein the kettle cover (12A) is movably connected to the kettle left side (12L) by a kettle cover left hinge (12AL) and movably connected to the kettle right side (12R) by a kettle cover right hinge (12AR).

4. The barbeque (10) as described in claim 2, wherein the kettle cover (12A) further comprises a kettle cover handle (12AA).

5. The barbeque (10) as described in claim 2, wherein the kettle cover (12A) further comprises a kettle cover gauge (12AB).

6. The barbeque (10) as described in claim 1, wherein the kettle left side (12L) further comprises a kettle left side support (12LA) and the kettle right side (12R) further comprises a kettle right side support (12RA).

7. The barbeque (10) as described in claim 1 further comprises a work table (14) attached thereto.

8. The barbeque (10) as described in claim 7, wherein the work table (14) comprises a left work table (14L) connected to the kettle left side (12L) and a right work table (14R) connected to the kettle right side (12R).

9. The barbeque (10) as described in claim 1 further comprises a rotisserie (16) which comprises a rotisserie shaft (16B) having a rotisserie sprocket (16A) securely mounted at one distal end, the rotisserie shaft (16B) further comprises a rotisserie tine (16C) thereon, the rotisserie sprocket (16A) is in communication with the drive sprocket (18A) by a chain (20).

10. The barbeque (10) as described in claim 9, wherein the rotisserie (16) further comprises a rotisserie bearing (16D) positioned at an opposite distal end of the rotisserie shaft (16B) from the rotisserie sprocket (16A).

11. The barbeque (10) as described in claim 1 further comprises a tray (26) positioned within the kettle (12).

12. The barbeque (10) as described in claim 11, wherein the tray (26) further comprises a tray left lift hook (26LA) having a tray left lift hook pin (26LAA) and a tray right lift hook (26RA) having a tray right lift hook pin, the tray left lift hook pin (26LAA) engages the kettle left side support (12LA) and the tray right lift hook pin engages the kettle right side support (12RA).

13. The barbeque (10) as described in claim 1 further comprises a housing (28) securely connected to a bottom of the kettle (12).

14. The barbeque (10) as described in claim 13, wherein the housing (28) comprises a housing door (28A).

15. The barbeque (10) as described in claim 13, wherein the housing (28) further comprises a housing base (28B).

16. The barbeque (10) as described in claim 14, wherein the housing base (28B) comprises at least two housing wheels (28C) rotatably mounted thereon.

17. The barbeque (10) as described in claim 1 further comprises a grill (30) positioned within the kettle (12).

18. The barbeque (10) as described in claim 1 further comprises a charcoal tray (32) having a charcoal tray left pin (32L) and a charcoal tray right pin (32R) which engagably mount into the kettle left side support (12LA) and the kettle right side support (12RA), respectively.

19. The barbeque (10) as described in claim 1 further comprises a gas burner (34) positioned within the kettle (12), the gas burner (34) comprises at least two controls, a gas burner left control (34L) and a gas burner right control (34R).

20. The barbeque (10) as described in claim 1 further comprises a brick tray (36) having a plurality of ceramic bricks (36A) thereon.

* * * * *